(12) United States Patent
Fodor et al.

(10) Patent No.: US 8,285,346 B2
(45) Date of Patent: Oct. 9, 2012

(54) METHOD AND ARRANGEMENT FOR REDUCING BATTERY POWER CONSUMPTION OF A USER EQUIPMENT

(75) Inventors: Gabor Fodor, Hasselby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 12/601,043

(22) PCT Filed: May 23, 2007

(86) PCT No.: PCT/SE2007/050346
§ 371 (c)(1),
(2), (4) Date: Nov. 20, 2009

(87) PCT Pub. No.: WO2008/143563
PCT Pub. Date: Nov. 27, 2008

(65) Prior Publication Data
US 2010/0184458 A1    Jul. 22, 2010

(51) Int. Cl.
*H04Q 7/20* (2006.01)
(52) U.S. Cl. ..... 455/574; 455/458; 455/572; 455/343.1; 455/445; 455/343.2; 370/311; 370/313; 370/328; 370/329; 370/331

(58) Field of Classification Search ........... 455/574, 455/572, 550.1, 573, 343.1–343.6, 344, 575.1, 455/90.3, 458, 445, 422.1, 403, 432.1, 435.1–435.3, 455/436–444, 502, 509, 500, 517; 370/310, 370/311, 313, 328, 329, 331, 332, 336, 341, 370/343
See application file for complete search history.

(56) References Cited

U.S. PATENT DOCUMENTS

| | | | |
|---|---|---|---|
| 7,957,360 B2 * | 6/2011 | Suzuki et al. | 370/341 |
| 2007/0064662 A1 | 3/2007 | Bultan et al. | |
| 2012/0009928 A1 * | 1/2012 | Wu et al. | 455/436 |

FOREIGN PATENT DOCUMENTS

| | | |
|---|---|---|
| EP | 1317156 A1 | 6/2003 |
| EP | 1511337 A1 | 3/2005 |
| GB | 2402301 A | 12/2004 |
| WO | 03/058992 A1 | 7/2003 |

* cited by examiner

*Primary Examiner* — Keith Ferguson
(74) *Attorney, Agent, or Firm* — Coats & Bennett, P.L.L.C.

(57) ABSTRACT

The present invention relates to a method and arrangements for saving battery power consumption of a UE in mobile telecommunication system. The method comprises the step of checking whether the UE fulfills at least one of the pre-determined criteria that a subscriber explicitly requests to receive paging at extended DRX cycle and that a new cell is not reselected during a pre-determined time. If the at least one of the pre-determined criteria is fulfilled the step of applying an extended DRX cycle is performed.

25 Claims, 7 Drawing Sheets

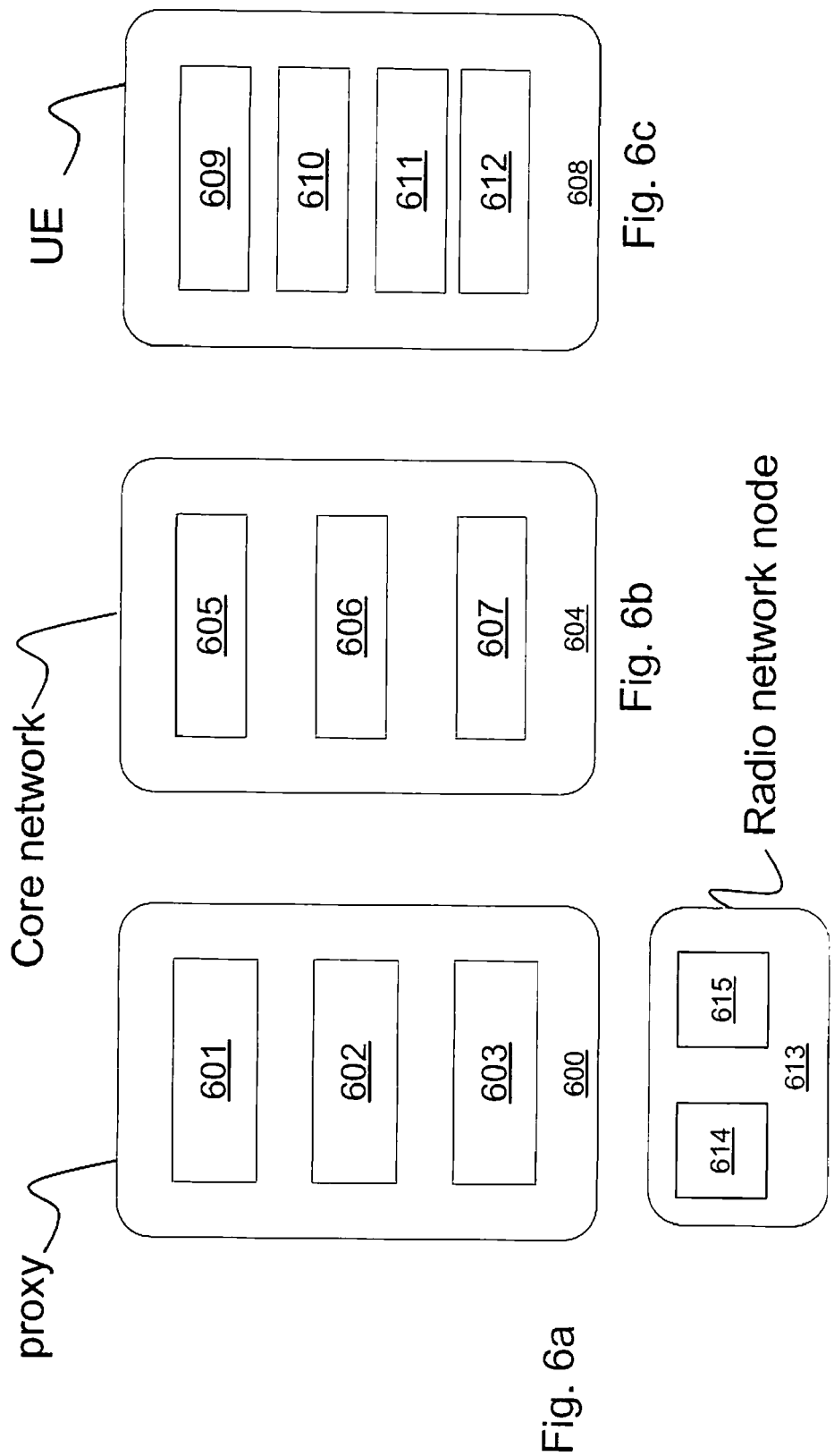

METHOD AND ARRANGEMENT FOR REDUCING BATTERY POWER CONSUMPTION OF A USER EQUIPMENT

TECHNICAL FIELD

The present invention relates to a method and arrangements for a cellular mobile telecommunication network, and in particular to a solution for reducing the User Equipment (UE) battery power consumption.

BACKGROUND

In Wide-band Code Division Multiple Access (WCDMA) and Long Term Evolution (LIE) systems, discontinuous reception (DRX) allows the user equipment (UE) to switch off its radio receiver and thereby drastically reduce its power consumption in idle mode or in other low activity modes. The low RRC activity mode in WCDMA includes Cell_PCH state, URA_PCH state and it can also include the Cell_FACH state. For instance, in WCDMA, when the UE is idle or is in the Cell_PCH or URA_PCH states, it can reduce its power consumption from 100-400 mA down to 5-10 mA using DRX. In the later release of WCDMA (release 7) the UE can also make use of DRX in connected mode to save its battery consumption. In LTE the same DRX cycles will be applicable in both idle and connected modes. This will allow considerable saving of the UE battery consumption.

A UE, once registered to the network is allocated a Paging Group (PG). For the PG, there are paging indicators (PIs) which appear periodically on the Paging Indicator Channel (PICH) that indicates when there are paging messages to any of the UEs belonging to that PG. Thus, when the UE is idle, its main task is to monitor the PICH periodically to receive information when the UE is being paged. That is performed by monitoring the PI:s for its associated PG. As stated above, the PI:s are carried on the PICH and the PI:s inform the different UEs about the instant when they should decode the information of the PCH channel. If the UE detects that its PI has been set, it listens to the paging channel (PCH) in the subsequent PCH frame. During those periods when it is not required to monitor the PICH, the UE typically conserves power by powering off its receiver. The time between the transmissions of successive PI:s for a given UE is the DRX cycle length. Because the UE's power consumption is less when its receiver is switched off than when it is on, the UE's power consumption and thereby its idle time is largely determined by the DRX cycle length.

The UE must be able to receive the paging information in the whole cell area. The less often the UE has to tune the receiver to listen for a possible paging message, the longer the terminal's battery will last in idle mode. The paging procedure is schematically illustrated in FIG. 1. An application 14 transmits a paging message 15 to the UE via the RNC 12 and the radio base station 11. A radio connection is set up 17 by means of a RRC connection request to allow the UE to respond to the paging message by sending a paging response 18.

When the UE is in idle mode, the UE also performs measurements in order to continuously camp on the best cell in terms of the received power and signal quality (measured on the common pilot channel or on reference symbols). In order for the UE to perform the necessary measurements, it needs to switch on its radio receiver to collect several measurement samples of the received pilot or reference symbol strength and/or quality. Furthermore, these measurements are done for several cells, which may also belong to different access technologies, as dictated by the neighbor cell lists. The UE evaluates the cell reselection criteria (as defined in TS 25.304: User Equipment (UE) procedures in idle mode and procedures for cell reselection in connected mode) at least once in every DRX cycle. If the UE is on the move, cell reselection related measurements and the corresponding evaluation must be made sufficiently frequently in order to be able to camp on the best cell.

Thus, the length of the DRX cycle represents a trade-off between the power consumption in certain UE modes (notably in idle mode) on the one hand and the paging response time and the accuracy of the cell reselection process on the other. Allowable DRX cycles are specified to address this trade-off in 3GPP TS 25.331. "Radio Resource Control Specification".

Subscribers are often stationary for a longer period of time. For instance, a large group of mobile subscribers stay in the office or at home for a long period as compared to the typical DRX cycle discussed above. In addition, in some situations, a subscriber may want to block incoming sessions including voice calls and other real time (e.g. video) sessions. Indeed, blocking of incoming calls is a common and well known service provided by, for instance the Session Initiation Protocol (SIP), further described in "SIP Silent Rejection Service", available at: http://www.sipcenter.com/sip.nsf/html/SIP+Silent+Rejection+Ser vice. Incoming call blocking is particularly useful for mobile phones that are often used as pocket calculators, digital cameras, music recording devices, i.e. for various non-network related services.

The existing technology described in TS 25.304 "User Equipment (UE) procedures in idle mode and procedures for cell reselection in connected mode" and TS 25.133 "Requirements for support of radio resource management (FDD)" facilitates power saving by allowing the UE to employ discontinuous reception. The elapsed time between successive measurements however is too conservative relative to the measurement period that is necessary in certain scenarios such as for large user group's typical or recurring scenarios. Therefore, the UE power consumption in this type of scenarios is higher than necessary.

This problem is recognized by the 3GPP in TS 25.133 "Requirements for support of radio resource management (FDD)", and therefore the DRX cycle length can be dynamically set. However, the fundamental trade-off between the DRX cycle length, the cell reselection process and the paging response time does not allow the DRX time to be set too high. This is because in the current design the UE keeps monitoring the PICH even when the subscriber (and, in effect, the UE) does not want to receive incoming calls and/or session initiations. Thereby, reducing the UE power consumption below the typical 5-10 mA is not possible with existing solutions.

SUMMARY

Thus, the object of the present invention is to reduce the UE battery consumption during idle mode.

This is achieved according to a first aspect of the invention by a method for saving battery power consumption of a (UE) in mobile telecommunication system. The method comprises the step of checking whether the UE fulfills at least one of the pre-determined criteria that a subscriber explicitly requests to receive paging at extended DRX cycle and that a new cell is not reselected during a pre-determined time. If the at least one of the pre-determined criteria is fulfilled the step of applying an extended DRX cycle is performed.

According to a second aspect of the present invention, a paging proxy is introduced. The paging proxy is associated with a mobile telecommunication network configured to receive a paging proxy configuration message indicating that the UE requests an extended DRX cycle and configured to receive a paging message from the network, wherein the paging proxy comprises means for handling the received paging message in accordance with the received paging proxy configuration message.

According to a third aspect of the present invention, a UE for a mobile telecommunication network, is adapted to monitor paging information in idle mode in accordance with a configured DRX cycle and it comprises processing means for checking whether at least one of the pre-determined criteria are fulfilled:
  a subscriber explicitly requests to receive paging at extended DRX cycle
  a new cell is not reselected during a pre-determined time.
    Further the UE comprises means for requesting the network to extend the DRX cycle when at least one of said criteria is fulfilled, and means for monitoring the paging information in accordance with the extended DRX cycle.

According to a fourth aspect of the present invention, a core network node of mobile telecommunication network is adapted to extend a DRX cycle for a UE in idle mode and is adapted to signal the extended DRX cycle to the UE. Further, the core network comprises means for configuring the UE with pre-determined criteria to be used for determining when the DRX cycle should be extended, wherein the said predetermined criterion is that a new cell is not reselected by the UE during a pre-determined time. The core network comprises also means for receiving a request to extend the DRX cycle, and means for extending the DRX cycle in accordance with the request and means for sending paging information in accordance with the extended DRX cycle.

According to a fifth aspect of the present invention a radio network node of a mobile telecommunication network is configured to receive information from the mobile telecommunication network of an extended DRX cycle for a user equipment and the radio network node is configured to transmit paging information to said user equipment in accordance with the extended DRX cycle.

An advantage with the present invention is that the DRX cycle is order(s) of magnitude longer than the typical values employed today. The conceptual difference enabled by the Paging Proxy is that the Paging Proxy based solution exploits information about the user mobility (that the user is stationary for a longer time period) and her willingness to temporarily ignore paging messages.

A further advantage is that it is possible to take advantage of incoming call blocking in that the invention combines it knowledge about the mobility pattern and allows power saving for the user equipment. Specifically, when the UE is both stationary and prefers to block in-coming calls, it is possible to prevent the UE from it to either perform measurements related to cell reselection or to monitor the paging information. This is in contrast to the DRX cycles of today's WCDMA and the evolving LTE systems that are in the range 80 ms-5.12 s and that does not take into account the scenario discussed above.

A further advantage is that the UE does not have to be switched off as compared to the DETACHED mode to save battery power. DETACHED mode is used in for instance GSM following the IMSI DETACH procedure. At IMSI Detach, when the GSM mobile station (MS) is being turned off (or the SIM card is taken out), the MS requests a Standalone Dedicated Control Channel (SDCCH). On the SDCCH, the MS sends a message to inform the network that the MS is about to switch to detached mode and the Subscriber will no longer be reachable. The MSC then marks the IMSI as detached in the VLR. The VLR sets an IMSI detached flag and rejects calls incoming to the MS. The Paging proxy based power saving mode differs from being DETACHED, since it does not require power off. In fact, with the Paging proxy based solution, "local services" of the mobile station (calendar, gaming, camera) can be used. Furthermore, with the proposed method, the MS reverts to normal operation as soon the UE executes a cell reselection, the UE leaves idle mode (e.g. Subscriber initiates a call) or the Subscriber order it to return to normal operation (pushing a button). Short Message Service (SMS) in detached mode is an application level service that the network "holds back" as long as the UE is not reachable (e.g. the UE is in detached mode). As an application level solution, it does not allow the UE to enter power saving mode without being DETACHED.

BRIEF DESCRIPTION OF THE DRAWINGS

FIG. 6 shows schematically the arrangements according to embodiments of the present invention.

DETAILED DESCRIPTION

Figure 1:
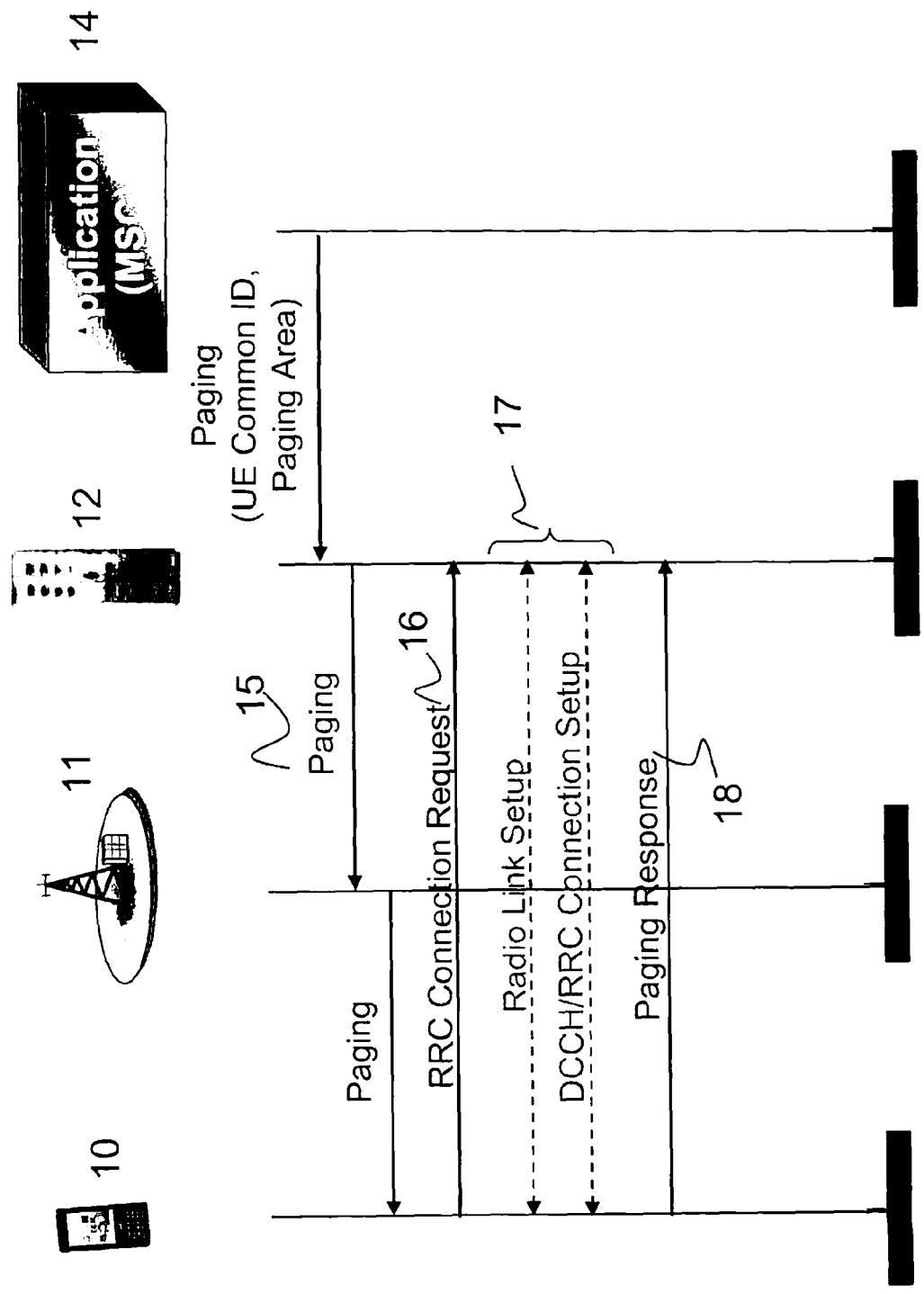
FIG. 1 illustrates schematically the paging procedure according to prior art.

The UEs stay in idle mode or in a low RRC activity state during longer time periods, therefore further reduction in UE power consumption during idle mode over an extended period of time can significantly increase the UE battery's standby time. By reducing the required power (current) from 10 mA to around 1 mA during idle mode, the standby time of a UE can be prolonged significantly.

Hence the basic concept of the present invention is to reduce the UE battery consumption by considerably extending the DRX cycle in some low RRC activity scenarios and specifically in the scenario when the UE remains stationary in idle mode during a longer period. Extending the DRX cycle means in this specification that the DRX cycle is extended significantly in the order of few minutes (e.g. between 60-180 seconds) compared to the existing maximum DRX cycle figures, which are in the order of 5 seconds.

Accordingly, the present invention applies an extended DRX cycle to save the battery when at least one of the following criterions is satisfied:
i) The subscriber explicitly request an extended DRX cycle, e.g. by pressing a button of the UE.
ii) Cell reselection is not performed during a certain time period.

According to a first aspect of the present invention a paging proxy 600 that is configured to handle paging messages (also referred to as paging information) from the core network is introduced as schematically illustrated in FIG. 6a. If the pre-determined criteria (criterion) are (is) fulfilled, the UE requests the paging proxy to extend the DRX cycle. The paging proxy comprises thus input/output (I/O) means 601 to receive a paging proxy configuration message indicating that the UE requests an extended DRX cycle. The input/output means is further configured to intercept the paging message from the core network to the UE, and the Paging comprises means for handling 602 the paging message in accordance with the paging proxy configuration message such that the I/O means 601 forwards the paging messages to the UE in accordance with the extended DRX cycle. According to one embodiment, the pre-determined criterion is that the subscriber explicitly requests an extended DRX cycle, e.g. by pressing a button of the UE. According to another embodiment, the pre-determined criteria are that the subscriber explicitly requests an extended DRX cycle and that cell reselection is not performed during a certain time period. Further, the paging proxy may comprise a memory 603 for storing paging related information received from the network. The paging proxy is a radio network entity e.g. co-located with the radio network controller, with a radio base station, with an Access Gateway (AGW), or with the eNode B (evolved Node B) which is a radio network controller combined with a radio base station. Both the AGW and the eNode B are the network nodes used in the LTE architecture.

According to a second aspect of the present invention, the extended DRX cycle is handled by the core network 604 as illustrated by FIG. 6b. The DRX cycle is set by a negotiation between UE and core network 604, therefore when the DRX cycle is to be extended or when it changes from the extended DRX cycle to the normal DRX cycle, a negotiation must be performed. The core network comprises according to the second aspect of the present invention means for extending the DRX cycle 605 for a UE in idle mode and I/O means 606 adapted to signal the extended DRX cycle to the UE. Further, it comprises means for configuring 607 the UE with pre-determined criteria related to cell reselection frequency to be used for determining when the DRX cycle should be extended, wherein the I/O means 606 is adapted to receive a request to extend the DRX cycle, and the means for extending the DRX cycle extends the DRX cycle in accordance with the request. Then the I/O means 606 sends the paging information in accordance with the extended DRX cycle. The pre-determined criteria for applying the extended DRX cycle is that cell reselection is not performed during a certain time period.

According to a third aspect of the present invention, as illustrated by FIG. 6c, the UE 608 comprises processing means 610 for checking whether any of the pre-determined criteria are fulfilled: that a subscriber of the UE explicitly requests to receive paging at extended DRX cycle or that a new cell is not reselected during pre-determined time, I/O means 611 for requesting the network to extend the DRX cycle when any of the said criteria is fulfilled, and monitoring means 609 for monitoring the paging information such as paging indicators on the PICH in accordance with the extended DRX cycle.

The extension of the DRX cycle may also result in that the paging proxy blocks all paging messages to the UE which implies that the UE does not have to monitor PICH at all during a time period.

The set of the predetermined criteria relates to cell reselection frequency or that the subscriber of the UE explicitly requests an extended DRX cycle, e.g. when he knows that he will stay in the same place during a longer period of time or that he wants to block in-coming calls. I.e. the predetermined criterion may be fulfilled when cell reselection has not been performed for a specific time interval e.g. configurable by the subscriber by selecting a menu item or by pushing a dedicated button on the UE. When the paging proxy is available, the pre-determined criterion is that the user explicitly requests an extended DRX cycle. Alternatively, the pre-determined criterion when a paging proxy is available is that the user explicitly requests an extended DRX cycle and that cell reselection is not performed during a certain time period.

As an example, the UE starts monitoring the time intervals between subsequent cell reselection events. When the UE experiences that it camps on the same cell for a predefined period ($T_0$), it enters the "Long DRX" state, which implies that an extended DRX cycle is applied. Another criterion could be if the UE camps on the same cell after N number of the successive cell reselection evaluations. The criteria parameters ($T_0$ or N) can be configured by the network. The parameters $T_0$ or N should be sufficiently large to ensure that UE has indeed become stationary. When "Long DRX" state criteria are fulfilled, the UE sets its DRX cycle to the predefined interval, which could either be subscriber configured (UE specific or implementation dependent), standardized (pre-defined rules) or network controlled. There can be more than one extended DRX cycle, e.g. cycles of 30 s, 60 s, 90 s, 120 s etc. The UE can either set any specific DRX cycle or it can extend the DRX cycle progressively. The rules for progressively increasing the DRX cycle can also be pre-defined. As an example, if the UE camps on the same cell after time $T_0$ then it selects DRX cycle=30 s; if it camps on the same cell after time $T_1=m_1 \times T_0$ then it selects DRX cycle=60 s and so on. The parameter $m_i$ can be UE specific, standardized or network controlled.

Other criteria may be that:
  the serving is not changed during specific time interval (T1) after successive cell reselection evaluations during the said specific time interval.
  the serving cell is not changed after any of the N2 out of total number of M2 cell reselection evaluations during specific time, where (N2<M2).
  the serving cell is not changed after any of the N3 out of total number of M3 successive cell reselection evaluations, where (N3<M3).

Further, the UE 608 typically also comprises means 612 for performing downlink measurements during idle mode. The extended DRX cycle may govern both the paging operation and the idle mode measurements. However, the two cycles i.e. for receiving paging indication and cell reselection can be separated. One example scenario is when the subscriber has not blocked incoming calls but the UE remains static for an extended period (e.g. staying at home or in office or during night). In such a scenario the extended DRX cycle will be used only for cell reselection, whereas the UE will still receive the paging according to the normal DRX cycle. The extended DRX cycle for cell reselection can considerably extend the UE battery standby time since in general there are several lengthy occasions during the course of the day (and night) when the UE remains camping on the same cell.

In accordance with one example of the present invention, when the predetermined criteria with respect to a specific UE are met, the DRX cycle for that particular UE is significantly extended up to, for instance 60-90-120 seconds or even more (e.g. several minutes). When such criteria are fulfilled, the UE enters the so called "Long DRX" State, which implies that an extended DRX cycle is applied to the UE. It should be noted that it is not necessary that the "Long DRX" state is standardized as a separate RRC state, although it may be a separate RRC state or a sub-state within e.g. "LTE_IDLE" in LTE systems. As described above, these certain criteria may include that the subscriber requests the "Long DRX" state by e.g. pushing a button and/or an autonomous decision by the UE on the condition that cell reselection has not been made consecutively for a specific time interval.

Figure 5A:
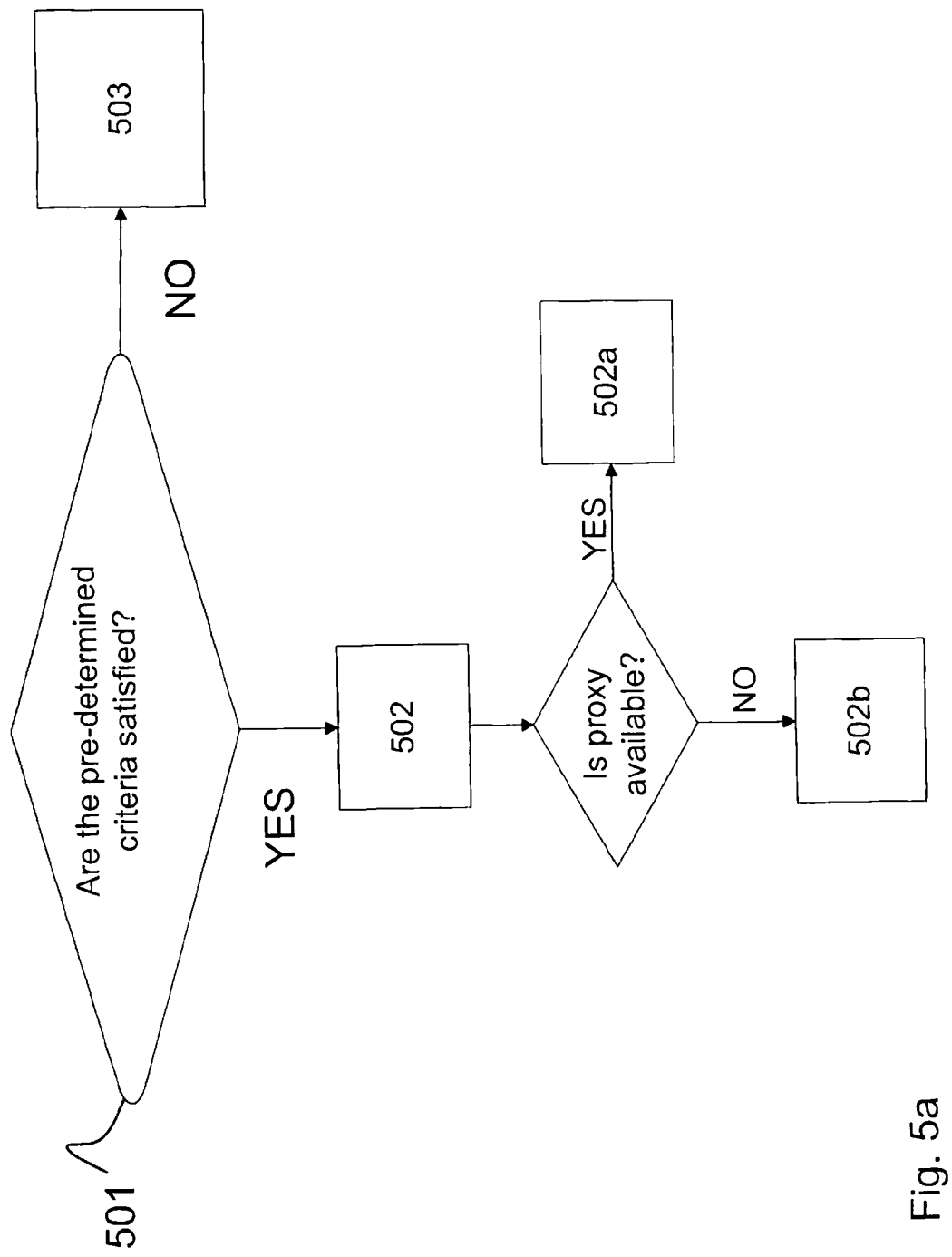
FIGS. 5a, 5b and 5c show the method according to embodiments of the present invention.

Thus, the basic concept of the current invention is to take advantage of the scenarios in which measurements for cell reselection can be made (much) less frequently than usually and the UE does not need to monitor the paging information. That is possible thanks to that the UE either signals that the subscriber of the UE explicitly requests an extended DRX cycle or that cell reselection is not performed during a certain time period, or that the UE explicitly requests an extended DRX cycle and that cell reselection is not performed during a certain time period. The method according to an embodiment of the present invention is described below in conjunction with the flowchart of FIG. 5a.

501. Is/are the predetermined criterion/criteria fulfilled?
If yes, then go to 502. Apply the extended DRX cycle.
If no, then go to 503. Keep the normal DRX cycle.

Step 502 may be performed in different ways 502a, 502b depending on whether a paging proxy is used or not. The flowchart of FIG. 5b shows the method 502a when a paging proxy is being used and the flowchart of FIG. 5c shows the method 502b when the extended DRX cycle is handled by the core network.

Figures 5B, 5C:
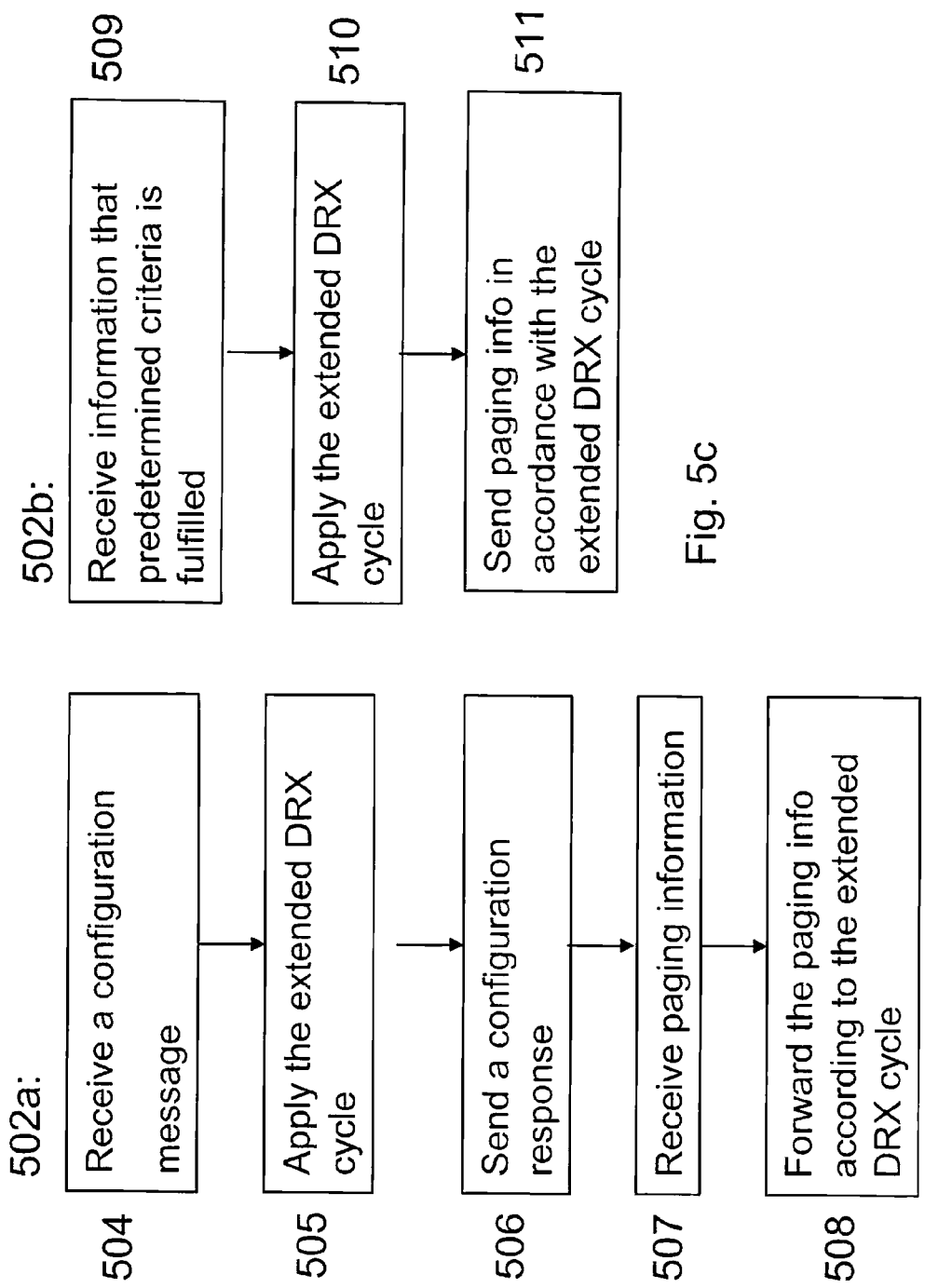

FIG. 5b shows schematically how the extended DRX cycle is applied by the paging proxy by 504. Receiving a paging proxy configuration message from the UE.
505. Applying an extended DRX cycle, by installing an extended DRX state for that UE.
506. Sending a paging proxy configuration response to the UE.
507. Receiving paging information from the network.
508. Forwarding the paging information to the UE in accordance with the extended DRX cycle.

FIG. 5c shows schematically how the extended DRX cycle is applied by the core network by 509. Receiving information the predetermined criteria related to that cell reselection has not been performed during a certain time period.
510. Applying an extended DRX cycle, by installing an extended DRX state for that UE.
511. Sending paging information to the UE in accordance with the extended DRX cycle. It should be noted that the paging information may be sent to the UE via the paging proxy, or to the UE directly.

Figure 2:
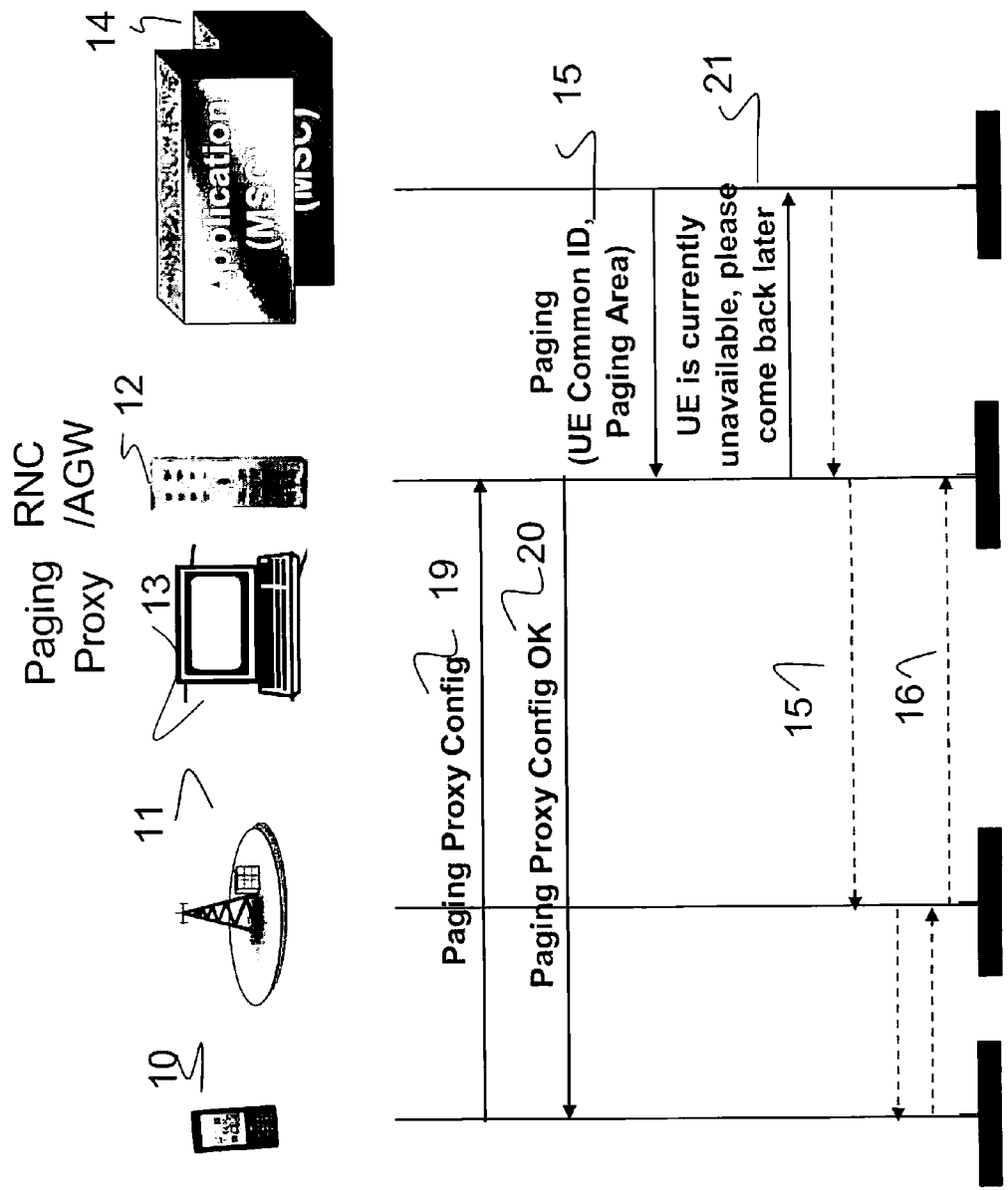
FIG. 2 illustrates schematically the paging procedure with the paging proxy according to one embodiment of the present invention.

FIG. 2 is a schematic high level view of a typical paging proxy assisted paging procedure in accordance with the embodiment disclosed by FIG. 5b. The UE 10 configures the paging proxy by sending a paging proxy configuration message 19, and the paging proxy 13 installs a state for that UE 10. The state information includes the identification of the UE and additional information regarding how the paging proxy should handle incoming paging messages. Such additional information may comprise information about the current Paging cycle (DRX cycle) for this UE, synchronization information, information about exception cases, possibly information about planned wake up time and other information (e.g. regarding what message should be sent back to specific UEs and/or Application programs, etc. For instance, the Paging Proxy may send a specific SMS message to a predefined UE if it has paged the UE.)

The paging proxy 13 responds with a paging proxy configuration response 20. In accordance with one alternative, the paging proxy filters all paging messages intended for this UE provided that that the paging proxy has installed a state for the UE. In accordance with a further alternative, the UE may specify whose paging should be sent to it with the extended DRX cycle.

Once the UE and the Paging Proxy confirmed entering the "Long DRX" state, the Paging Proxy acts according to predefined rules on behalf of the UE. The Paging Proxy examines the paging message and if it detects that the message is intended to the UE that is in the "Long DRX" state, it takes the action that is specified in the corresponding UE state. Such action can be dependent on which core network initiated the paging. It can also be dependent on the Application (running e.g. in the IMS domain) that triggered the particular paging process.

By using the paging proxy 13, e.g. located in an RNC 12 or AGW 12, the extended paging may be transparent to the core network 14. I.e., when the core network 14 sends paging information to the UE 10 via the proxy 13, the core network 14 does not have to be aware of the extended DRX cycle, it can according to one alternative transmit its paging information in accordance with the normal DRX cycle where the paging proxy forwards the paging information in accordance with the extended DRX cycle. In accordance with a second alternative, the core network can get information from the paging proxy 13 that the extended DRX cycle is applied which means that the UE is currently unavailable and the core network has to transmit its paging information 15 later in accordance with the extended DRX cycle as shown in FIG. 2.

Further, the UE monitors the paging information in accordance with the extended DRX cycle which means that the UE monitors either monitor the paging information, but less frequently than in the normal case, or it does not monitor the paging information at all if the DRX cycle is set to infinity. The extended DRX cycle may e.g. be set to infinity if the subscriber wants to block in-coming calls. Moreover, the UE may also perform measurements related to cell reselection according to the extended DRX cycle. If the UE monitors paging information with the extended DRX cycle, the Paging Proxy may send paging messages to it with the normal DRX cycle if the UE has indicated some exceptions. This operation requires that the "B party" (either the IMS Application or the B party subscriber) is aware of the "Long DRX" operation mode. For instance, if no exceptions have been made a B-party initiating a circuit switched voice call may have to wait for a long time for the UE to answer the call. In such a case, the Paging Proxy may answer on the UE's behalf and send a message to the B-party.

When the criteria for entering the extended DRX cycle is no longer fulfilled i.e. that the UE performs cell reselection or that the subscriber explicitly terminates the long DRX mode, the UE returns to its normal operation which implies that the DRX cycle is reset to the normal value by informing 16 the paging proxy.

Figure 3:
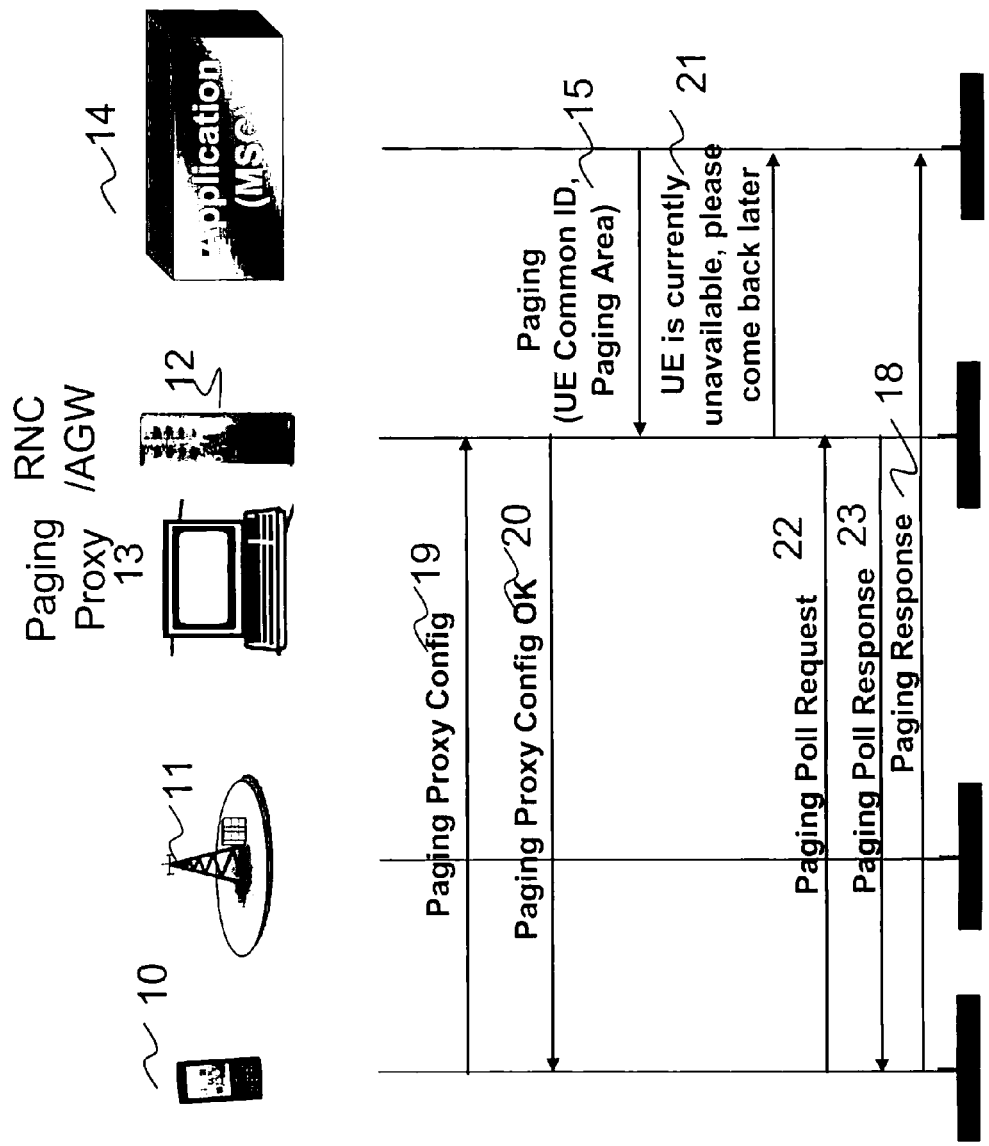
FIG. 3 illustrates schematically the paging procedure with the paging proxy according to one embodiment of the present invention.

When the Paging Proxy has installed the UE state, the UE may query the Paging Proxy whether there has been any Paging messages intended to it by e.g. sending a paging poll request 22. This is illustrated in FIG. 3, which shows the same elements as FIG. 2 except the polling procedure. As stated above the paging proxy comprises according to one embodiment a memory 603 for storing paging related information. The paging proxy responds to the query by transmitting a paging poll response 23 comprising information whether there have been any Paging messages intended to it. This functionality is especially useful if the UE chooses not to monitor the PICH at all while in the "Long DRX" state.

Hence, the Paging Proxy memory 603 may also comprises means for storing information about the B-party and the event that would have caused paging in the normal operation. This requires a light weight protocol between the B-party and the Paging Proxy (but such protocols either exist or are straightforward to develop by a person skilled in the art using the basic features of e.g. the Session Initiation Protocol (SIP)). In this case, the UE is configured to autonomously query the Paging Proxy about "missed" incoming captured Paging Messages. Upon obtaining such information, the UE can establish a contact using SIP with e.g. the IMS Application.

When the Subscriber deactivates this operation or when the UE detects that there has been a cell change (due to cell reselection), the UE leaves the "Long DRX" state. It informs the Paging Proxy, after which the Paging Proxy uninstalls the UE state.

The RAN has to be aware of the currently valid DRX cycle of the UE. This can be achieved, for instance, by the Paging Proxy informing the RAN (in LTE effectively the eNB) after the UE Long DRX state is installed. Thus in accordance with a further aspect of the present invention, a radio network node 613 such as a eNB (illustrated in FIG. 6d) comprises receiving means 614 for receiving information from the core network of a changed DRX cycle for a specific user equipment. The radio network node comprises further transmitting means 615 for transmitting paging information to the specific user equipment in accordance with the changed DRX cycle to ensure that the RAN is synchronized to the currently valid DRX cycle of the UE. Since managing the paging indicator channel (including the setting of the paging indicator, PI) is the responsibility of the RAN (and specifically in an LTE system the serving eNB), the RAN has to be able to ensure that during the (relatively short) period while the UE monitors the PICH and demodulates the PI, the PI is correctly set.

Figure 4:
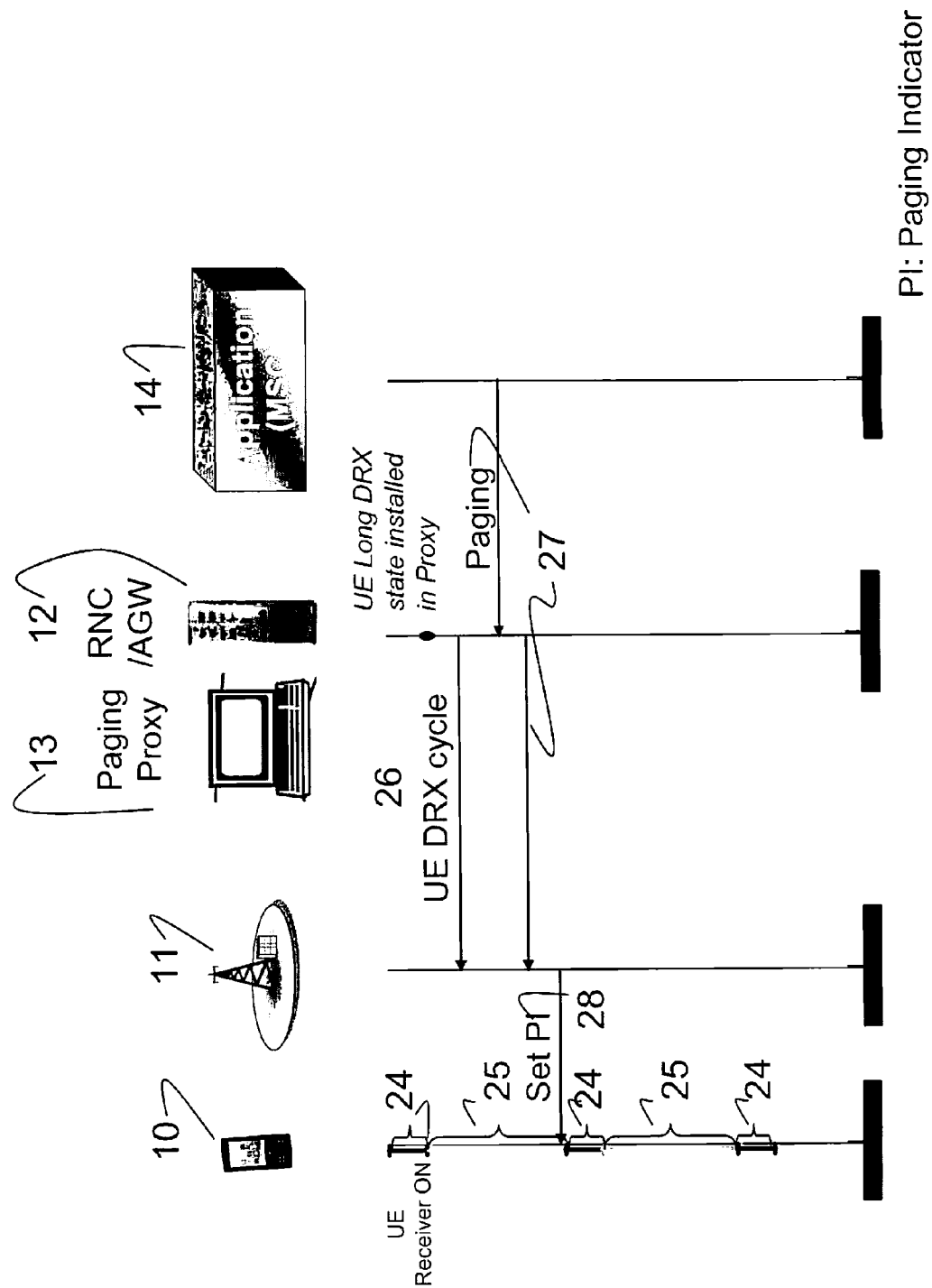
FIG. 4 illustrates schematically synchronization of the paging procedure with the paging proxy according to one embodiment of the present invention.

This can be achieved by a light weight signalling protocol between the paging proxy 13 and the eNB 11 as shown in FIG. 4. According to this arrangement, the paging proxy 13 informs 26 the eNB 11 about the DRX cycle as soon as the DRX cycle state has been established. Once the eNB learns the DRX cycle of that specific UE, the paging proxy can forward the paging message 27 to the eNB as soon as it arrives at the paging proxy in accordance with the current DRX cycle. (Thus, the paging proxy can either hide the extended DRX cycle from the CN or the CN is being aware of the extended DRX cycle. Irrespective of that, since the RAN at this point is aware of the UE specific (extended) DRX cycle, the paging proxy should send the paging message to the RAN, since the paging proxy does not know the delay between the paging proxy and the eNB and there is no reason not to send it.) The eNB in turn can set the associated PI 28 appropriately to ensure that the UE gets paged when it is ready to receive paging information. It should be noted that reference numeral 24 indicates when the UE receiver is on and reference numeral 25 indicates when the UE receiver is off.

When the paging proxy acts on behalf of the UE as described above, it effectively performs a service, for which the operator can charge. The proposed paging proxy solution can support various charging solutions. From this perspective, two cases can be distinguished:

In the first case, the radio network (RAN) and the core network are run by the same operator. In this case, it is up to the operator to define chargeable events. For instance, a chargeable event can be that the UE state is installed in the paging proxy. Another chargeable event can be when the UE polls the paging proxy for incoming paging messages. Alternatively, the operator may choose not to define chargeable events at all, but charge a flat fee for the paging proxy service.

In the second case, the RAN and the core network are run by different operators. In this case, the definition of the chargeable events must be part of the business agreement between the involved (RAN and core network) operators.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for saving battery power consumption of a User Equipment (UE) in a mobile telecommunication system, said method comprising:
   checking whether any predetermined criteria are fulfilled, said predetermined criteria including a request criterion that is fulfilled if the UE explicitly requests to receive paging at an extended DRX cycle, and a reselection criterion that is fulfilled if cell reselection is not performed for the UE for a predetermined period of time; and
   applying an extended DRX cycle to the UE, if at least one of the predetermined criteria is fulfilled.

2. The method of claim 1, wherein said applying comprises configuring a paging proxy, such that the paging proxy will receive paging information from the network on behalf of the UE and forward the paging information to the UE in accordance with the extended DRX cycle.

3. The method of claim 1, wherein, in cases where the reselection criterion is fulfilled, said applying comprises receiving information indicating that the reselection criterion is fulfilled, and, in response, installing an extended DRX state for the UE in the core network, and sending paging information to the UE in accordance with the extended DRX cycle.

4. A paging proxy associated with a mobile telecommunication network and comprising:
   input/output circuits configured to receive a paging proxy configuration message indicating that a user equipment (UE) requests an extended DRX cycle, and configured to receive a paging message for the UE from the network and forward the received paging message to the UE; and
   a processing circuit configured to control forwarding of the received paging message by the input/output circuits in accordance with the received paging proxy configuration message, such that said input/output circuits forward the received paging message to the UE in accordance with the extended DRX cycle.

5. The paging proxy of claim 4, wherein the paging proxy configuration message indicates an extended DRX cycle set to infinity implying that the UE requests not to be paged during a time period and wherein the paging proxy is further configured to receive the paging message on behalf of the UE.

6. The paging proxy of claim 5, wherein the paging proxy comprises electronic storage for storing information related to the received paging messages.

7. The paging proxy of claim 6, wherein the paging proxy comprises a communication circuit configured for sending the stored information to the UE.

8. The paging proxy of claim 5, wherein the paging proxy is configured to indicate to the network when the UE is willing to receive paging messages again.

9. The paging proxy of claim 4, wherein the paging proxy configuration message indicates that the UE requests an extended DRX cycle during a time period, and the paging proxy is adapted to forward the received paging message to the UE in accordance with the extended DRX cycle.

10. The paging proxy of claim 9, wherein the paging proxy is configured to transmit a message indicating the extended DRX cycle to a radio network node such that the radio network node can synchronize with the extended DRX cycle.

11. The paging proxy of claim 9, wherein the time period is a predetermined time period.

12. The paging proxy of claim 9, wherein the end of the time period is indicated by a message received from the UE.

13. The paging proxy of claim 4, wherein the processing circuit is configured to forward the received paging message to the UE in accordance with the extended DRX cycle by being configured to:
   intercept the paging message sent from the network to the UE when the UE is in the extended DRX cycle; and
   delay sending the paging message to the UE until a time when a receiver of the UE is scheduled to be on.

14. The paging proxy of claim 4, wherein the processing circuit is further configured to hide from the network that the UE has requested the extended DRX cycle, is operating in the extended DRX cycle, or both.

15. The paging proxy of claim 4, wherein the paging proxy is operatively connected between a base station supporting the UE and the network, such that the paging proxy receives the paging proxy configuration message via the base station, and forwards the received paging message to the UE via the base station.

16. A user equipment (UE) for a mobile telecommunication network, said UE adapted to monitor paging information in idle mode in accordance with a configured DRX cycle and comprising:
   a transceiver for communicating with the network; and
   one or more processing circuits operatively associated with the transceiver and configured to send a request to extend the DRX cycle for the UE, in response to determining that a request criterion is fulfilled or that a reselection criterion is fulfilled, said one or more processing circuits further configured to consider the request criterion as fulfilled responsive to detecting an explicit request by a user of the UE for an extended DRX cycle, and to consider the reselection criterion as fulfilled responsive to determining that cell reselection has not been performed for the UE for a predetermined period of time.

17. The UE of claim 16, wherein the one or more processing circuits are configured to send the request for the extended DRX cycle as a paging proxy configuration message sent to a paging proxy, and wherein the paging proxy is configured to intercept and handle paging messages sent to the UE by the network in accordance with the paging proxy configuration message.

18. The UE of claim 16, wherein the UE is configured to transmit a paging poll request to the paging proxy and to receive a paging poll response in order to receive information about paging messages received by the paging proxy on behalf of the UE.

19. The UE of claim 16, wherein the one or more processing circuits are configured to check whether the reselection criterion is fulfilled and, if so, to send a request for an extended DRX cycle to a core network node in the network.

20. The UE of claim 16, wherein the UE is configured to perform downlink measurements while in an idle mode, in accordance with the extended DRX cycle.

21. The UE of claim 16, wherein the UE is configured to receive DRX cycle information in accordance with the extended DRX cycle.

22. The UE of claim 16, wherein the UE is configured to request a shorter DRX cycle.

23. The UE of 16, wherein the paging information comprises paging indicators.

24. A core network node of a mobile telecommunication network adapted to extend a DRX cycle for a user equipment (UE) in idle mode and adapted to signal the extended DRX cycle to the UE, wherein the core network node comprises:
   input/output circuits configured for: sending a reselection criterion to be used by the UE in determining whether to request use of an extended DRX cycle; receiving a request to extend the DRX cycle of the UE; and sending paging information for the UE; and
   one or more processing circuits operatively associated with the input/output circuits and configured to: in response to receiving the request to extend the DRX cycle of the UE, control sending of the paging information for the UE in accordance with the extended DRX cycle; and
   wherein the reselection criterion defines a predetermined period of time, and wherein the UE considers the reselection criterion satisfied if no cell reselection for the UE occurs for the predetermined period of time.

25. The core network node of claim 24, wherein the paging information comprises a paging indicator.

* * * * *

UNITED STATES PATENT AND TRADEMARK OFFICE
CERTIFICATE OF CORRECTION

PATENT NO. : 8,285,346 B2  
APPLICATION NO. : 12/601043  
DATED : October 9, 2012  
INVENTOR(S) : Fodor et al.

Page 1 of 1

It is certified that error appears in the above-identified patent and that said Letters Patent is hereby corrected as shown below:

Title Page, Item (75), under "Inventors", in Column 1, Line 1, delete "Hasselby" and insert -- Hässelby --, therefor.

In the Specifications:

In column 1, Line 15, delete "(LIE)" and insert -- (LTE) --, therefor.

Signed and Sealed this  
Ninth Day of July, 2013

Teresa Stanek Rea  
*Acting Director of the United States Patent and Trademark Office*